UNITED STATES PATENT OFFICE.

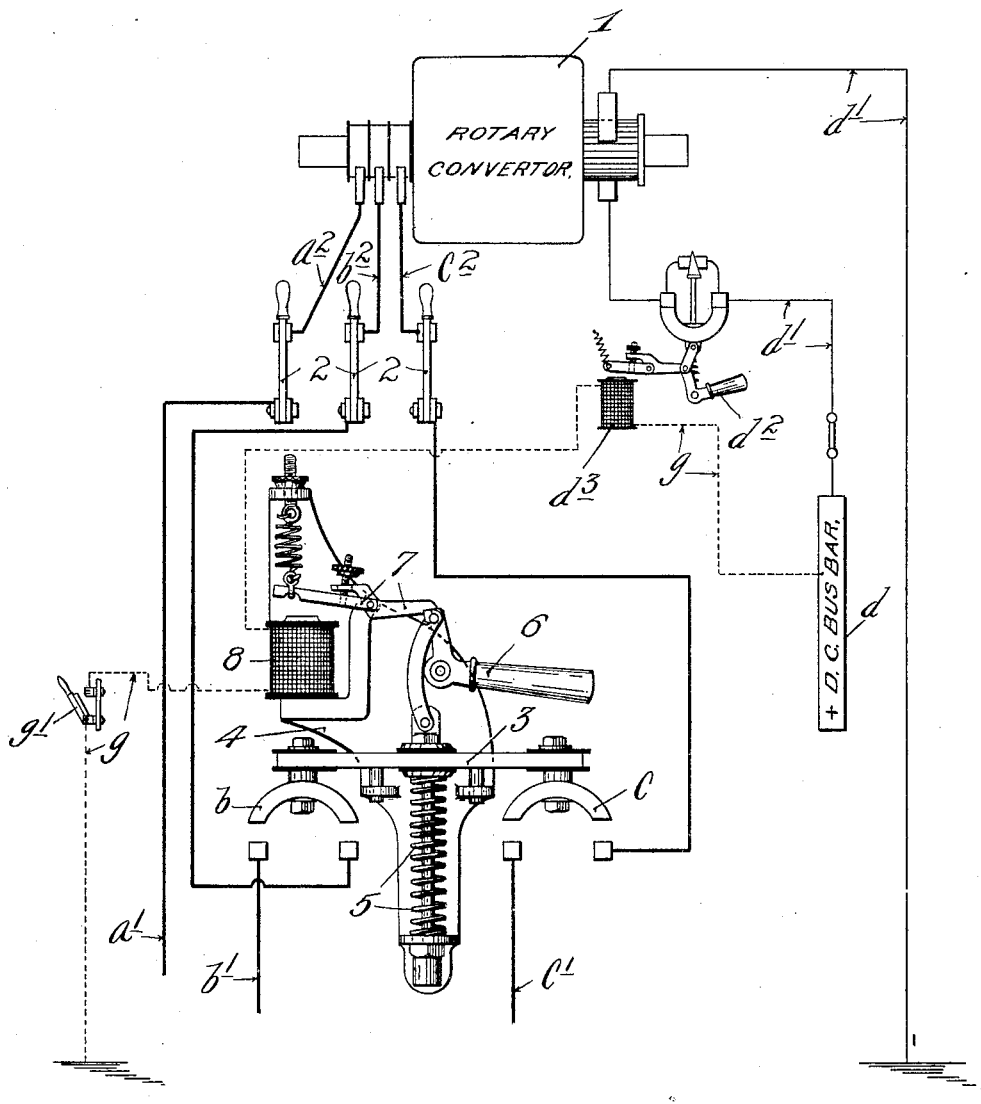

JOHN PEARSON, OF ST. PAUL, MINNESOTA.

SAFETY-SYNCHRONIZER FOR COUPLING INTO PARALLEL ALTERNATING-CURRENT MACHINES.

SPECIFICATION forming part of Letters Patent No. 673,085, dated April 30, 1901.

Application filed February 19, 1901. Serial No. 47,985. (No model.)

*To all whom it may concern:*

Be it known that I, JOHN PEARSON, a citizen of the United States, residing at St. Paul, in the county of Ramsey and State of Minnesota, have invented certain new and useful Improvements in Safety-Synchronizers for Coupling into Parallel Alternating-Current Machines; and I do hereby declare the following to be a full, clear, and exact description of the invention, such as will enable others skilled in the art to which it appertains to make and use the same.

My present invention has for its object to provide a safety synchronizing device for use in coupling into parallel alternating-current machines. The purposes had in view are substantially the same as those disclosed in my prior patent, No. 649,526, issued to me of date May 15, 1900.

When a rotary converter is started up from the direct-current side, in order to bring the same up to proper speed for coupling the same into circuit with an alternating-current machine or group of machines already in action it is desirable to cut the rotary converter out from the direct-current at substantially the same time that it is coupled into parallel with the other alternating-current machine. If it is cut out too early or too late, injurious results are likely to follow. In my said prior patent I disclosed means whereby the closing of a circuit-controller in the alternating-current circuit would open the circuit-breaker in the direct-current circuit. Otherwise stated, the two circuit-controllers were interdependent. The closing of one would open the other, or it might be that the opening of one would close the other. In the present instance I provide a pair of circuit-controllers, one in the alternating-current circuit and another in the direct-current circuit, and then provide an actuating device for both controllers which is independent of either. More specifically stated, the two controllers have electric trips, with the magnets thereof connected into a common trip-circuit, which may be closed by hand.

The invention is illustrated in the accompanying drawing, wherein like notations refer to like parts.

$a'$ $b'$ $c'$ represent the leads from a three-phase alternator or group of alternators already in action, and $a^2$ $b^2$ $c^2$ represent the corresponding alternating-current leads from the rotary converter 1. 2 represents the hand-switches for connecting said leads. In said alternating-current circuit is located an automatic or self-closing switch. As shown, the said switch is provided with only two clips (marked $b$ and $c$, respectively) for connecting two sets of the corresponding phase-leads from the machines to be coupled, the other corresponding phase-leads $a'$ and $a^2$ being under the control of the hand-switch therein located and being normally closed. The trips $b$ and $c$ are carried by a bar 3, which is mounted and truly guided for a straight-line reciprocating action on a fixed bracket 4 or other suitable support. The bar 3 is subject to a strong spring 5, which tends to throw the switch into its closed position and there hold the same under considerable tension. The bar 3 is also subject to a hand-lever 6 for cooperation with a compound trip-lever 7 to set the switch in its open position and there hold the same under strong tension from its closing-spring 5. The armature member of the compound trip-lever 7 is spring-held and is subject to a magnet 8, located in the trip-circuit. As shown, this trip-circuit $g$ is a grounded circuit, receiving current from the positive member of the bus-bars $d$ at the distributing-station, and contains a hand-switch $g'$. The armature member of the rotary converter 1 is connected into a grounded circuit $d'$, shown as receiving current from said positive member $d$ of the bus-bars. The field of the converter is connected into a grounded direct-current shunt-circuit. (Not shown.) The direct-current circuit $d'$ contains a circuit-breaker, which, as shown, is of standard type and includes a hand-lever $d^2$ and a trip-magnet $d^3$. The trip-magnet $d^3$ is located in the trip-circuit $g$, being, as shown, connected up in series with the trip-magnet 8 of the automatic switch.

When synchronizing by hand, reliance is usually placed upon a bank of pilot-lamps or other signal device to indicate to the operator the conditions of the system. If the lamps be cross-connected between corresponding phase-leads of the machines to be coupled, the lamps will be bright when the machines substantially coincide in phase and frequency, and thereby indicate to the operator when the coupling should be effected. If direct-connected, the lamps would be dark when the machines coincide in phase and frequency. With the device herein disclosed the lamps or other suitable signal devices would be used for the same purpose. The hand-switches, however, would be closed as their normal position. The automatic switch would be set in its open position, as shown. Then when the lamps or other signal device indicates the proper condition for coupling the operator would simply close the hand-switch $g'$ in the trip-circuit $g$, thereby energizing the magnet 8 of the automatic switch, thus tripping the switch and permitting the same to quickly assume its closed position under the action of its spring 5. At the same instant the energizing of the magnet $d^3$ of the circuit-breaker would trip the circuit-breaker and permit it to assume its open position under the effect of its operating-spring, thus cutting the rotary out from the direct current. In this way the rotary converter is cut out from the direct current at substantially the same instant it is coupled into the alternating current, which are the conditions desirable for safety.

Mechanical instead of electric trips might be substituted for releasing the two circuit-controllers—to wit, the direct-current circuit-breaker and the alternating-current automatic switch—provided the mechanical trips should be provided with a common actuating device, so as to insure the desired timing in the movements of the two controllers.

What I claim, and desire to secure by Letters Patent of the United States, is as follows:

1. The combination with direct-current leads and alternating-current leads, of a circuit-controller for the direct-current leads, a circuit-controller for the alternating-current leads, and means independent of said two controllers for simultaneously actuating both controllers, substantially as and for the purposes set forth.

2. The combination with direct-current leads and alternating-current leads, of a circuit-controller for the direct-current leads, a circuit-controller for the alternating-current leads, and a common actuating-circuit for said two controllers, substantially as and for the purposes set forth.

3. The combination with a rotary converter, having direct-current leads and alternating-current leads, of an automatic or self-closing switch in the alternating-current leads, an automatic circuit-breaker in the direct-current leads, and means independent of said switch and circuit-breaker, for simultaneously tripping the same, substantially as described.

4. The combination with a rotary converter having direct-current leads and alternating-current leads, of an automatic or self-closing switch in the alternating-current leads, an automatic circuit-breaker in the direct-current leads, electric trips for said switch and said circuit-breaker, having their magnets connected into a common trip-circuit, and a hand-switch for controlling said trip-circuit, substantially as and for the purposes set forth.

In testimony whereof I affix my signature in presence of two witnesses.

JOHN PEARSON.

Witnesses:
MABEL M. McGRORY,
F. D. MERCHANT.